United States Patent [19]
Lissel et al.

[11] Patent Number: 5,757,308
[45] Date of Patent: May 26, 1998

[54] RADAR PROCESS FOR THE MEASUREMENT OF DISTANCES AND RELATIVE SPEEDS BETWEEN A VEHICLE AND ONE OR MORE OBSTRUCTIONS

[75] Inventors: Ernst Lissel, Wolfsburg; Ralf Mende, Bad Harzburg; Hermann Rohling, Wolfenbüttel, all of Germany

[73] Assignee: Volkswagen AG, Wolfsburg, Germany

[21] Appl. No.: 729,051

[22] Filed: Oct. 10, 1996

[30] Foreign Application Priority Data

Oct. 14, 1995 [DE] Germany ............... 195 38 309.5

[51] Int. Cl.$^6$ .................. G01S 13/60; G01S 13/93
[52] U.S. Cl. ............... 342/70; 342/111; 342/116
[58] Field of Search ............... 342/70, 71, 72, 342/106, 109, 111, 116, 137, 114

[56] References Cited

U.S. PATENT DOCUMENTS

| | | | |
|---|---|---|---|
| 3,786,509 | 1/1974 | Applebaum et al. | 342/159 |
| 4,045,797 | 8/1977 | Krage | 342/115 |
| 4,276,549 | 6/1981 | Tomasi | 343/7.5 |
| 4,901,083 | 2/1990 | May et al. | 342/128 |
| 4,970,519 | 11/1990 | Minnis et al. | 342/165 |
| 5,252,981 | 10/1993 | Grein et al. | 342/200 |
| 5,274,380 | 12/1993 | Yatsuka et al. | 342/70 |
| 5,359,331 | 10/1994 | Adler | 342/124 |

*Primary Examiner*—John B. Sotomayor
*Attorney, Agent, or Firm*—Baker & Botts, L.L.P.

[57] ABSTRACT

In the particular embodiment disclosed in the specification, a CW radar process for measurement of distances and relative speeds between a vehicle and one or more obstructions including transmitting a sequence of constant-frequency radar signal bursts which follow one another without any time interval during four successive measurements. In the first measurement, the radar signal bursts are of sequentially increasing frequency and in the second measurement they are of sequentially decreasing frequency while in the third measurement they have the same frequency and in the fourth measurement the burst frequencies follow a coded pattern. Demodulation of the signals which are reflected by obstructions is carried out by mixing them with the transmitted signals using only one single-channel mixer providing an output signal which is not the signal of a phase curve but of an amplitude curve.

8 Claims, 4 Drawing Sheets

FIG 3

RADAR PROCESS FOR THE MEASUREMENT OF DISTANCES AND RELATIVE SPEEDS BETWEEN A VEHICLE AND ONE OR MORE OBSTRUCTIONS

BACKGROUND OF THE INVENTION

This invention relates to a continuous wave (CW) radar process for simultaneous measurement of distances and relative speeds between a vehicle and one or more obstructions in which the transmitted signal contains constant-frequency bursts or sections which follow one another without any time interval.

Heretofore, radar technology has been used primarily for measurement of distances and relative speeds in aviation and involves the detection of a distances with a range of between a few hundred meters and many kilometers. In contrast, the particular conditions of road traffic necessitate the detection of distances in a range from less than 1 meter up to more than 100 meters. Furthermore, distance warning and protection systems for road vehicles must be able to detect a relatively large number of obstructions simultaneously with as much characteristic data as possible in view of road traffic conditions which are generally indefinite and complicated in comparison with aviation routes. In principle, it is desired to detect three types of data, namely, the distance between the vehicle and an obstruction, the relative speed between the vehicle and the obstruction, and the amplitude of the transmitted signal reflected by the obstruction in order to obtain information about the size of the obstruction. A further requirement for radar processors which are to be used in road vehicles is for cost-effective implementation since use in mass-production vehicles would otherwise not be feasible.

Known radar processes which allow simultaneous distance and relative speed measurement with respect to a plurality of obstructions, such as described in Kleinheubach Reports 1991, Volume 35, pages 731 to 740, can be implemented only at an extremely high cost since the wide frequency shifts result in large differences in signal frequencies resulting in a bandwidth to be processed which is too wide for commercial signal processors.

In order to overcome this disadvantage, German Offenlegungsschrift No. 42 44 608 discloses a CW radar process in which the transmitted signal produced by an oscillator is divided into constant-frequency bursts or sections which follow each other without any delay. The received signal which is reflected by the obstructions is in this case down-mixed with the transmitted signal to baseband in a two-channel, in-phase and quadrature-phase, (IQ) mixer. The IQ mixer supplies a complex, relatively low-frequency mixer output signal which is used to generate signals representing the distances and relative speeds with respect to a plurality of obstructions.

In the described process, four measurements with different transmitted signals are carried out during one measurement cycle. In a first measurement, the oscillator produces a sequence of bursts at a constant frequency which rises linearly and incrementally from a minimum value to a maximum value and after this, in a second measurement, a sequence of bursts at a frequency which falls linearly and incrementally from the maximum value to the minimum value. A complex signal is detected at the end of each reflected burst in both sequences, and first and second in-phase and quadrature-phase signals are obtained for the distances and the relative speeds by mixing the detected signal with the transmitted signal bursts. During a third measurement, the transmitted signal comprises a sequence of bursts at the same frequency. In this case, a complex sample is detected at the end of each reflected burst and mixed with the bursts of the transmitted signal in order to obtain third in-phase and quadrature-phase signals for the relative speeds between the vehicle and the obstructions.

All the mixer output signals for the three measurements are converted by Fourier transformation into relative speed-dependent and distance-dependent frequency values which represent three families of intersecting straight lines in a relative speed/distance diagram, in which intersections of the lines represent potential obstructions. These intersections may represent actual obstructions or else spurious obstructions which have been caused by the mathematical operations. To eliminate spurious indications of obstructions, a signal is transmitted during a fourth measurement in which the bursts do not follow one another monotonically but are arranged to correspond to the coefficients of a residue class code. During the fourth measurement, the received signal consists of a superimposition of all the object reflection signals with differing amplitude and phase.

All the intersection parameters of the straight lines in the speed/distance diagram which result from the first three measurements are checked for correctness and unambiguity by generating a reference mixer output signal for the transmitted signal of the fourth measurement for each of the potential obstructions, which reference signal is then correlated with the actual mixer output signal for the fourth measurement. The particular correlation characteristics of the residue class code give a high correlation level only for real obstructions, and a low correlation level for spurious obstructions. The correlation starts with the object having the highest amplitude. If a real obstruction is determined, then the corresponding reference mixer output signal and the correlation is continued in a decreasing amplitude sequence, a normalized amplitude of the reference mixer output signal being used during the correlation and only the phase element of the complex signals being considered.

The IQ mixer which is used in conventional processes for obtaining in-phase and quadrature-phase signals is subject, however, to a series of errors, such as offset error, crosstalk on the modulation signal in the I output and the Q output, sensitivity asymmetries of the I output and the Q output, and orthogonality errors between the I output and the Q output, for example, so that complicated pre-processing of the radar data in the time domain and error calibration are necessary.

SUMMARY OF THE INVENTION

Accordingly, it is an object of the present invention to provide a radar process for measuring distances and relative speeds between a vehicle and one or more obstructions which overcomes the disadvantages of the prior art.

Another object of the invention is to provide a radar distance and speed measuring process in which complex error calibration and preprocessing of the radar data are avoided and a simplified radar device can be utilized.

These and other objects of the invention are attained by transmitting continuous constant frequency, frequency-coded bursts of radar signals from a vehicle without any time interval between separately transmitted signals, simultaneously receiving the transmitted signal which have been reflected from obstructions, mixed the transmitted signals and the received signals in a single-channel mixer to obtain a mixer output signal which is a product of the transmitted and received signals, and obtaining signal values from the mixer output signals which represent the distances and the relative speeds between the vehicle and detected obstructions.

By using a matched transmitted signal waveform, it is possible to carry out the determination of distance and relative speed with respect to one or more obstructions from the transmitted signal with the aid of raw radar data which are not sampled in a complex manner, and distance and speed determinations can be classified as being correct or false with the aid of a special calculation process. Using this process, obstructions can therefore be detected with high probability and, furthermore, with a very low false-alarm rate, in a typical short-range radar application. The major advantages of the radar detecting process of the invention are based primarily on the ability to use a radar device of simple design. In consequence, the signal processing is also far less complex than in the case of conventional processes which operate with two channels and, as a result, generate non-orthogonalities or amplitude differences between the mixers, for example. Since these problems do not occur with the present invention, it is possible to avoid complicated preprocessing of the raw radar data in the time domain.

According to an advantageous refinement of the process according to the invention, the oscillator of the radar device produces constant-frequency bursts, which follow one another without any time interval, during a first measurement, the successive bursts having frequency which rises linearly and incrementally from a minimum value to a maximum value and the number of bursts being selected according to the desired resolution. During a second measurement, the oscillator produces corresponding bursts at a frequency which falls linearly and incrementally from the maximum value to the minimum value. A real mixer output signal relating to an amplitude curve is obtained in each case for distances and relative speeds with respect to the obstructions by mixing the bursts of the transmitted and received signal of the two measurements. In contrast, the oscillator is driven during a third measurement so as to produce constant-frequency bursts at the same frequency, and a real mixer output signal relating to an amplitude curve is obtained for the relative speed between the vehicle and the obstructions by mixing the transmitted signal with the reflected received signal. The real mixer output signals from the first three measurements are then converted by means of Fourier transformations into relative-speed-dependent and distance-dependent frequency values which represent families of intersecting straight lines in a relative-speed/distance diagram, whose intersections represent potential obstructions. These potential obstructions can represent both real obstructions and spurious obstructions which are produced by the mathematical operations.

In order to eliminate spurious obstructions, the oscillator is driven during a fourth measurement for the purpose of producing bursts which follow one another in time at frequencies for correlation encoding, a real mixer output signal is detected by mixing the frequency-encoded bursts of the transmitted and received signal, and a comparison is carried out between the mixer output signal and reference mixer output signals which are derived from the intersections of the relative speed/distance diagram.

During the fourth measurement, the oscillator is preferably driven so as to produce bursts, which follow one another in time, of a residue class function in accordance with the relationship:

$$f_{n A}(t) = f_t + f_{incr}(A^n \bmod (P));$$

where n=0 ... N−1, N=P−1 and P is a prime number and A is a natural number which is selected for the respective length N such that N different coefficients are produced, $f_t$ is the carrier frequency of the oscillator and $f_{incr}$ is the frequency increment.

In order to eliminate the spurious obstructions which are produced from the first three measurements during the mathematical operations on the relative speed-dependent and distance-dependent frequency values, a reference mixer output signal is determined in each case using the transmitted signal of the fourth measurement, from the speeds and distances which are assigned to the intersections on the relative speed/distance diagram, and is correlated with the actual mixer output signal, i.e., the actual value of the fourth measurement, in such a manner that a correlation level which is above a predetermined threshold value is obtained for a real obstruction, and a correlation level which is below the threshold value is obtained for a spurious obstruction.

Since only one mixer output signal relating to an amplitude curve is obtained as a result of the use of a single channel mixer, but the correlation is carried out using the phase element of the reference mixer output signal, the real obstructions are identified by determining the correlation using different assumed initial or basic phase angles until the highest correlation level is found. Despite the use of approximations, the correlation level for a spurious obstruction is not high.

The actual mixer output signal of the fourth measurement includes the sum of all the received signals reflected from all the targets. For this reason, the correlation is carried out using the reference mixer output signals for all potential obstructions iteratively, that is to say the correlation is carried out for the obstruction having the highest amplitude first and its reference mixer output signal is subtracted from the actual mixer output signal, provided this obstruction is determined to be a real obstruction. The correlation with the reference mixer output signal for the next obstruction is then carried out using the revised mixer output signal. The procedure is repeated in sequence for the remaining obstructions having the highest aptitude until the correlation is below a set threshold value.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
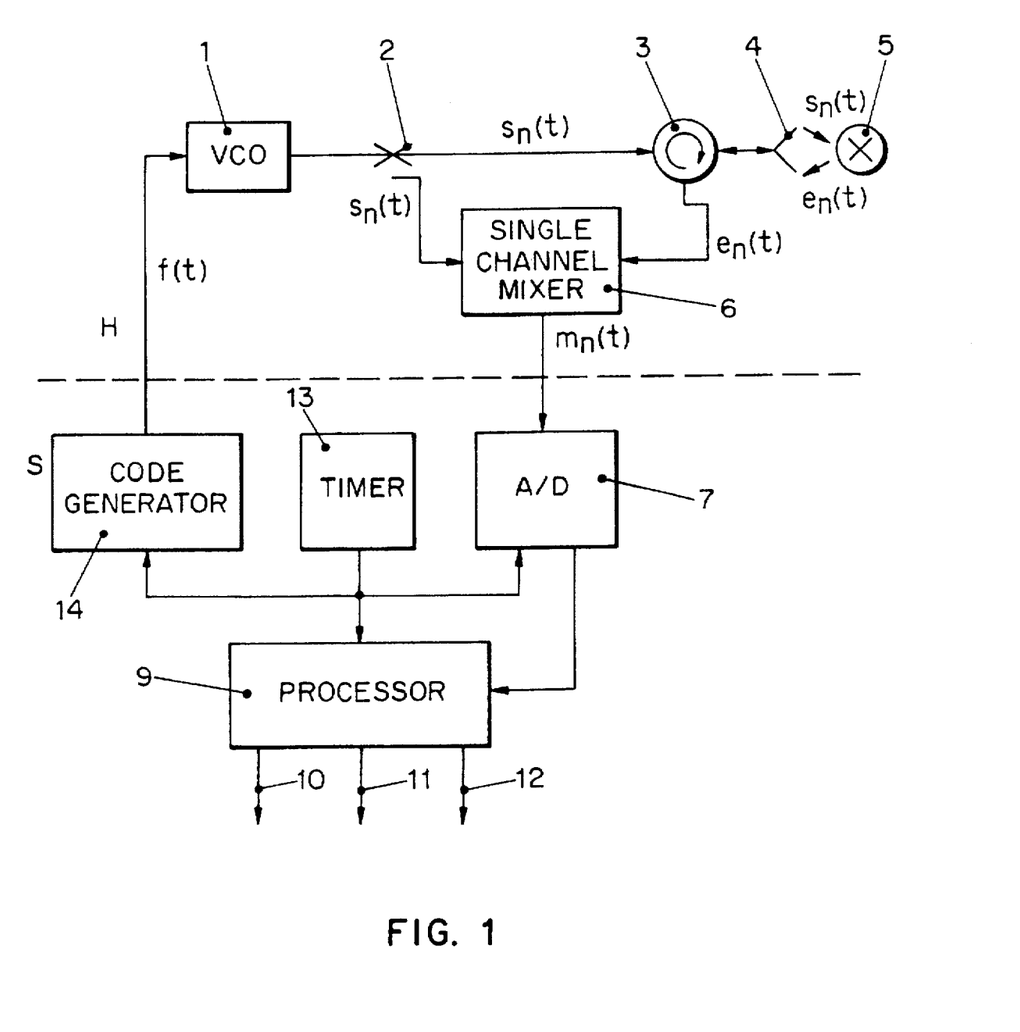
FIG. 1 is a schematic block diagram illustrating the arrangement of a representative radar system for carrying out the process according to the invention.

Referring first to the block diagram shown in FIG. 1, the radar system is split into a radio-frequency or microwave transmitting and detecting section H and a signal processing section S. A voltage-controlled oscillator 1 normally produces a continuous microwave signal having a frequency which may be varied, for example by varactor diode, over a plurality of multiples of 150 MHz in accordance with a control modulation signal f (t). In the process of the invention the oscillator is used to produce a transmitted signal $s_n(t)$ in successive constant-frequency bursts which pass through a coupler 2 and a circulator 3, which has a direction of operation indicated by the arrow, to a transmitting and receiving antenna 4 in a vehicle equipped with the radar system. An obstruction 5 which is located on the roadway in front of the vehicle receives the transmitted signals $s_n(t)$ and returns reflected signals $e_n(t)$ to the antenna as shown by arrows in FIG. 1.

The circulator 3 separates the transmitted signals $s_n(t)$ from the reflected signals $e_n(t)$ so that only the reflected signals received from the obstruction pass to the right-hand input of a single-channel mixer 6. At the same time, the transmitted signals $s_n(t)$ are supplied from the coupler 2 to the left-hand input of the mixer as shown in FIG. 1. The single-channel mixer 6 produces an output in analog form representing the difference frequency between the transmitted signal and the received signal as a real mixer output signal $m_n(t)$. Conversion of the analog signals into digital signals is carried out in a downstream analog/digital converter 7 in the signal processing section S. The digital signals are then supplied to a signal processing device 9, having three outputs 10-12 at which signal values representing the respective distance, the relative speed and the amplitude, that is to say the size of the obstruction, are produced. The signal processing unit 9, which receives timing signals from a timer 13, also supplies control signals to a code generator 14 which produces the control modulator signal f(t) for the oscillator 1.

Figure 2:
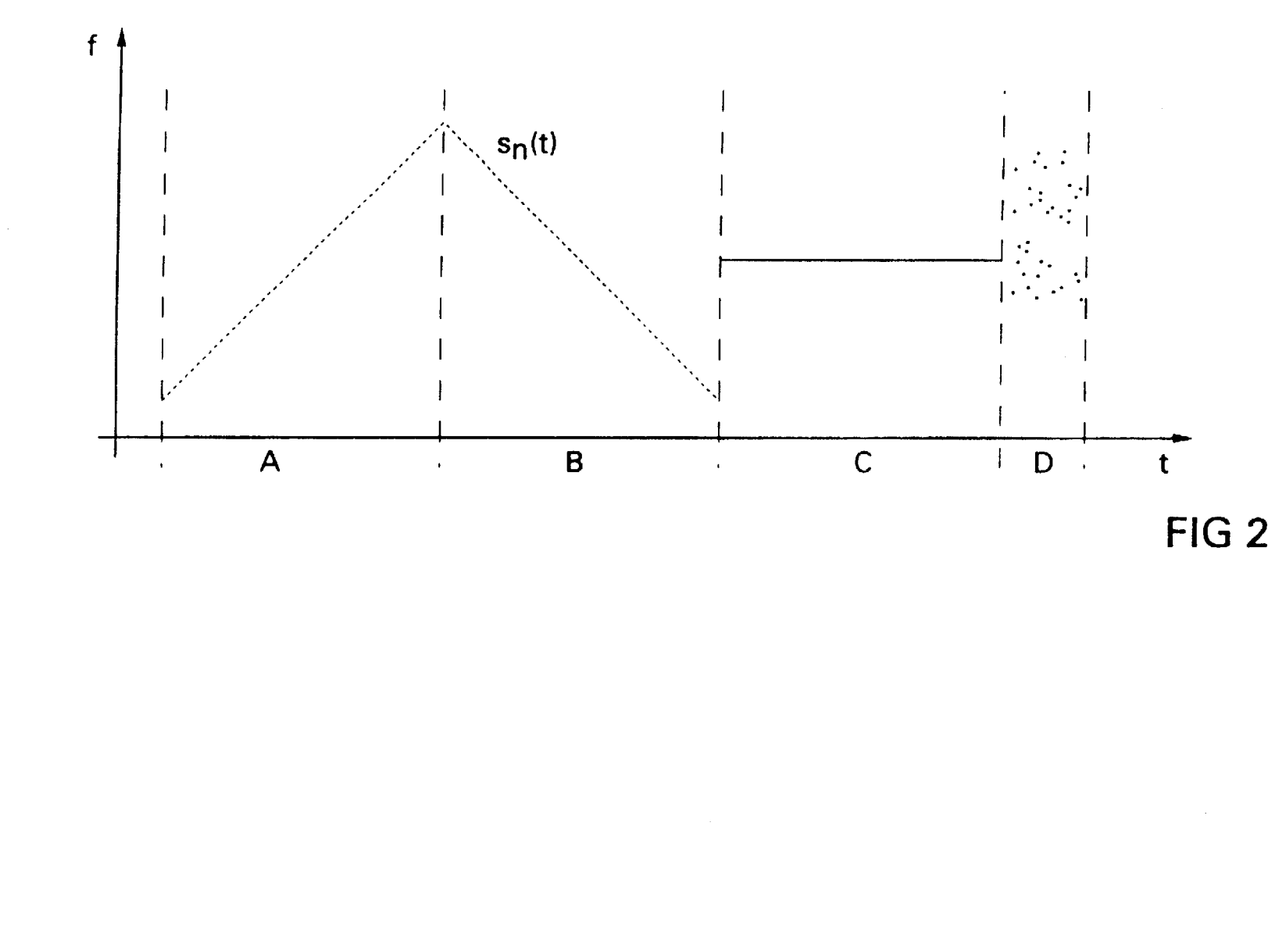
FIG. 2 is a graphical representation illustrating the frequency profile of the transmitted signal during one measurement cycle.

In the process according to the invention, the transmitted signal $s_n(t)$, which is separated into successive constant-frequency bursts without any time interval between them, has bursts of frequency f which changes with respect to time t in the manner shown in FIG. 2, and is transmitted in four different blocks A–D. The measurements in the blocks A, B and C are used to detect obstructions and the subsequent measurement in the block D are used to distinguish real obstructions from spurious obstructions. In the exemplary embodiment, transmission of all four measurement blocks A–D during each measurement cycle occupies a total time period of 9.21 milliseconds. In this embodiment, this measurement cycle is repeated cyclically, the maximum repetition rate accordingly being 108.5 Hz.

All four measurements are carried out sequentially, that is to say the measurement A is carried out first, followed in a corresponding manner by the measurement B and so on During the measurement A, the oscillator 1 of the radar system according to FIG. 1 is driven by a corresponding control signal f(t) so that, starting from a minimum frequency, it produces a sequence of 256 bursts having frequencies which rise linearly and incrementally to a maximum value. The frequency of the modulated transmitted signal can in this case be specified by the following formula:

$$f_{n1}(n) = f_t + n \cdot f_i;$$

n being in the range from 0 to 255, the carrier frequency being $f_t = 76$ GHz and the smallest possible frequency change in the modulated transmitted signal being $$f_i = \frac{f \text{shift}}{N} = \frac{150 \text{ MHz}}{256}.$$

In contrast, during the measurement B, the oscillator 1 produces a linear sequence of bursts having frequency starting from the maximum and with the opposite gradient, so that the minimum frequency is reached at the end of the measurement. The frequency of the modulated transmitted signal can in this case be stated as follows:

$$f_{n2}(n) = f_t + (255-n) \cdot f_i;$$

In contrast, during the measurement C, 256 bursts are transmitted which are all at the same frequency which is intermediate between the minimum and maximum frequency values of the measurements A and B, i.e.:

$$f_{n3}(n) = f_t + 128 \cdot f_i.$$

During the measurement D, the frequency of the modulated transmitted signal corresponds to a residue class function having the following formula in the exemplary embodiment:

$$f_{n4}(n) = f_t + 110 \cdot f_i - (5^m \bmod 37) \cdot f_i;$$

where n is the range from 0 to 71 and m=int(n/2).

The received signal $e_n(t)$ which is reflected during the first three measurements A, B, C can be specified by the formula:

$$e_n(t) = a \cdot \cos \omega_e t;$$

where $\omega_e = 2\pi f_e$ and a is the normalized received signal level. This signal is down-mixed with the transmitted signal $s_n(t)$ in accordance with the formula:

$$s_n(t) = \cos \omega_n t;$$

where $\omega_n = 2\pi f_n$. The corresponding mixer output signal $M_n(t)$ now has the formula:

$$m_n(t) = 1/2 a \cdot \cos(\omega_e - \omega_n) t;$$

$$m_n(t) = 1/2 a \cdot \cos(\omega_n - \omega_d)(t - T_r) - \omega_n t);$$

where $T_r$ is the signal delay time, $f_d$ is the Doppler frequency and $\omega_d = 2\pi f_d$, the Doppler angular frequency.

By way of example, the signal block for measurement A is given by the formula:

$$m^{n1}(t) = 1/2 a \cdot \cos((\omega_{n1} - \omega_d)(t - T_r) - \omega_{n1} t);$$

$$m_{n1}(t) = 1/2 a \cdot \cos((\omega_d t - \omega_{n1} T_r - \omega_d T_r).$$

As a result of sampling at the time $t_a$ and the discrete transmitted frequency profile, the equation can now be written in discrete time form as:

$$m_{n1}(nT_a) = 1/2 a \cdot \cos(\omega_d n T_a - n \omega_i T_r - \omega_i T_r - \omega_d T_r);$$

where $\omega_{n1} = \omega_t + n \cdot \omega_i$ in which n=0 to 255, and the $T_a$ is the sampling period.

The terms $\omega_i T_r$ and $\omega_d T_r$ are assumed to be constant for the duration of a measurement A, B or C. They represent a constant initial phase, which is not significant for the further analyses. These assumption are justified because any drift in the carrier frequency takes place only over a relatively long period of time and the term $\omega_d T_r$ changes negligibly during one measurement cycle as a result of the limited relative speed differences and accelerations of motor vehicles.

The following expression is thus used as the starting point for the mixer output signal:

$$m_{n1}(nT_a) = 1/2 a \cdot \cos (\omega_d n T_a - n \omega_i T_r);$$

where $\omega_i = 2\pi f_i$.

By introducing $N=256$, $n=0 \ldots N-1$, $T_{block}=NT_a=N/f_a$ and $\omega_r=\omega shift/N$, the equation can be rewritten as follows:

$$m_{n1}=1/2a \cdot \cos n/N(\omega_d T_{block}-\omega_{shift}T_r);$$

$$m_{n1}(nT_a)=1/2a \cdot \cos 2\pi n/N(f_d T_{block}-f_{shift}T_r);$$

$$m_{n1}(nT_a)=1/2a \cdot \cos 2\pi n/N(k-1).$$

The term $k=f_d T_{block}$ can assume values of between 0 and 127. This also applies to $l=f_{shift}Tr$. The number k corresponds to one of 128 gates into which the speed unambiguity range is split, and l is the number of the range gate which corresponds to the actual range of the reflecting object.

Figure 3:
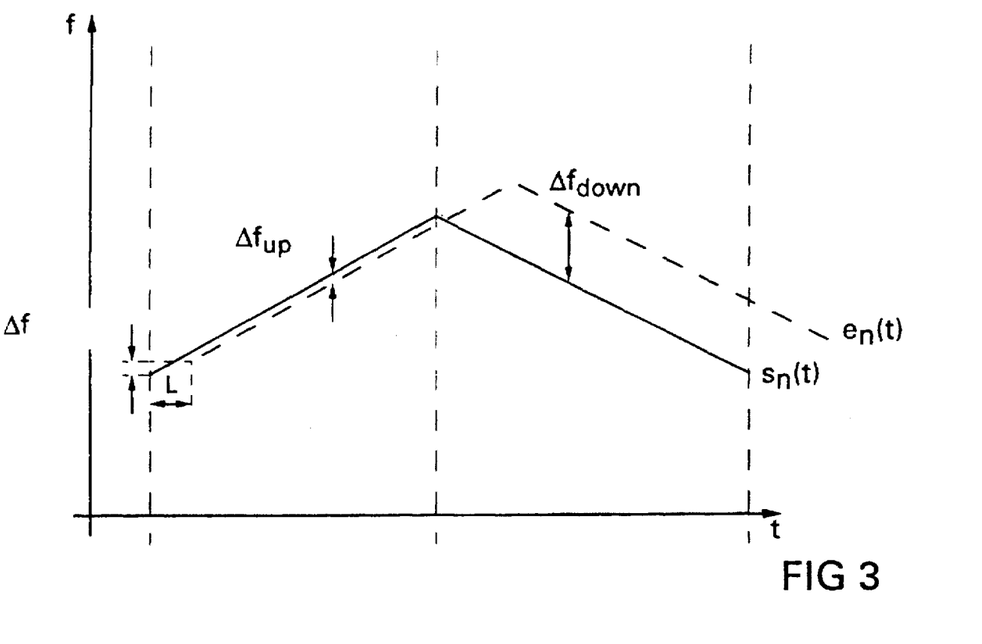
FIG. 3 is a graphical representation showing the frequency profiles of the transmitted and received signals for the first two measurements A and B.

The mixer output signals $m_n(t)$ which are formed during the first three measurements A, B and C are each weighted using a Hamming window, and the raw data are transformed into a frequency domain by means of Fourier transformations:

$$M_{nl}\left(j\frac{\omega_a}{N}r\right) = \sum_{n=0}^{N-1} m_{nl}(nT_a) \cdot e^{-j\frac{2\pi \cdot r \cdot n}{N}};$$

where $N=256$, $r=0 \ldots 127$, and I is the measurement A, B or C, the first measurements A and B in this case making it possible to carry out a simultaneous measurement of the distance and relative speed for an obstruction which is prominent because of a high reflection amplitude. FIG. 3 is a frequency/time diagram showing the profiles of the transmitted signal $s_n(t)$ and of the reflected received signal $e_n(t)$ for the measurements A and B. In this diagram l designates the echo delay time and $\Delta f_{Doppler}$ designates the Doppler frequency. The Doppler frequency and the frequency differences $\Delta f_{up}$ and $\Delta f_{down}$ give the following relationships for the relative speed and the distance or range:

$$k = \Delta f_{Doppler} = \left(\frac{\Delta f_{down}-\Delta f_{up}}{2}\right) \text{ and } l = \Delta f_{range} = \left(\frac{\Delta f_{down}+\Delta f_{up}}{2}\right).$$

Because of the ambiguity of the mathematical relationships, the measurements A and B do not give an unambiguous result for more than one target. The measurement C contributes to reducing the ambiguities to a major extent.

In the exemplary embodiment, each Fourier transformation which is carried out after the measurements A, B and C supplies 128 spectral windows. In this case, the spectral lines which occur are caused by reflections from obstructions. The stated designations apply to the first measurement and the second measurement. In the measurement C, the frequencies which are indicated by the maxima are equal to the Doppler frequencies of the obstructions.

The amplitude spectra which are produced by the Fourier transformation are extended and shifted in order to obtain unambiguous range and speed zones. Algorithms which search for relative and absolute maxima and compare them with an adaptive threshold which is formed for each block of the received signal during the measurements A, B and C separately lead to lists of relevant spectral lines, whose position in the spectrum is determined by the parameters k and l of each obstruction. The search for potential obstructions is carried out on this basis as shown in a speed/range diagram illustrated in FIG. 4, where k is the relative speed between the vehicle and the obstruction and l is the distance to the obstruction.

Figure 4:
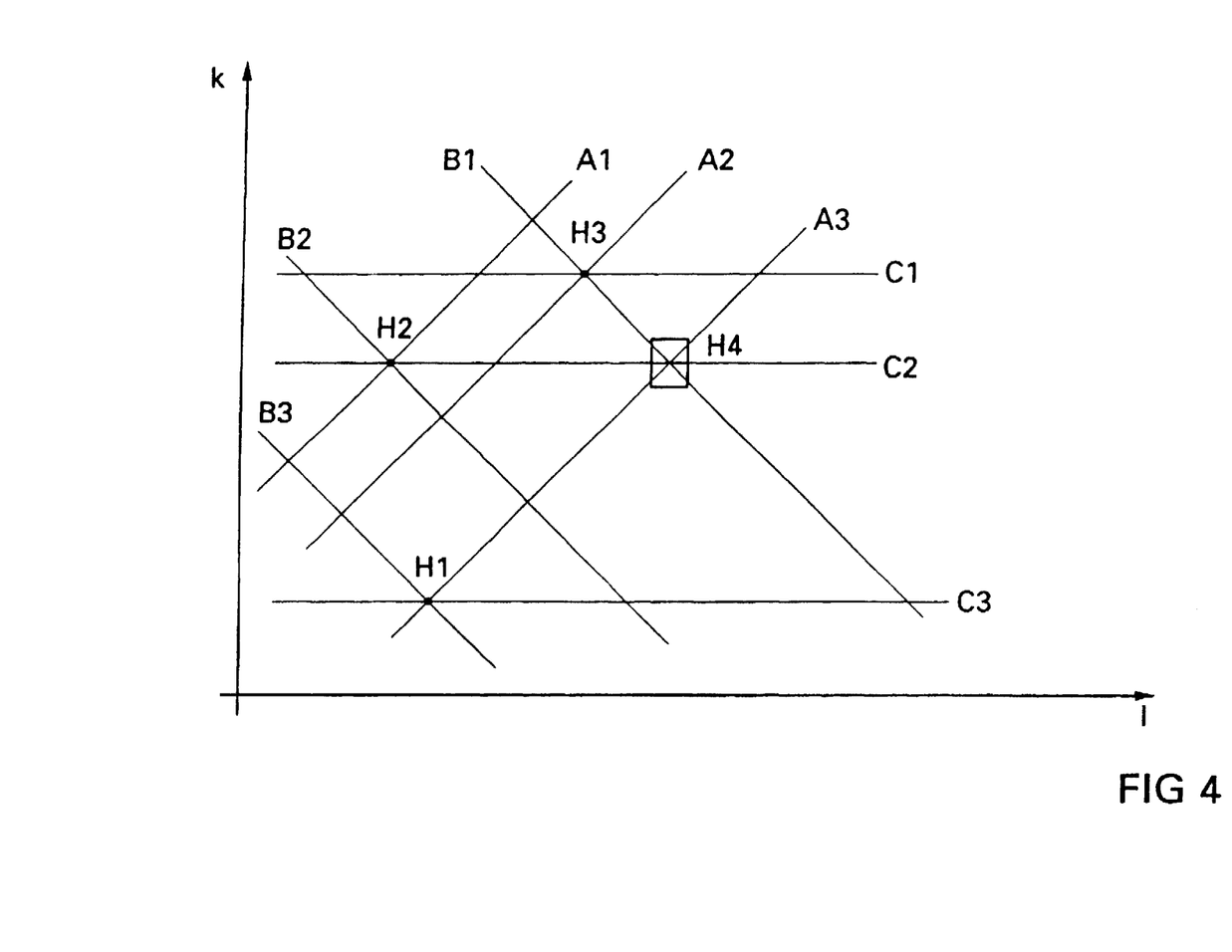
FIG. 4 is a graphical speed/range diagram showing the frequencies determined during the first three measurements A, B and C.

In the speed/range diagram, the frequencies which are determined in the three measurements A, B, C are designated by families of intersecting straight lines each of which corresponds to a potential obstruction. The straight lines A1, A2 and A3 relate to the measurement A, the straight lines B1, B2 and B3 relate to the measurement B, and the straight lines C1, C2 and C3 relate to the measurement C. After the mathematical operation on the measurement results, only the triple intersections of the straight lines A1 to C3 are left as potential obstructions. These may be actual obstructions H1, H2 and H3 or else a spurious obstruction H4, which is caused by the mathematical operation.

The list of the supposed obstructions H1–H4 determined as a result of the measurements A, B and C is subjected to an iterative check based on correlation. For this purpose, the mixer output signal $m_{n4}(t)$ from measurement D is correlated with the calculated reference mixer output signal for the intersections H1–H4 matching the measured range l and the relative speed k. The correlation starts with the obstruction having the highest amplitude, the minimum from the measurements A, B or C being used as the amplitude measure. This procedure eliminates incorrectly detected targets with a high level of reliability, as well as those which are located outside the relevant range and speed zone. The mixer output signal $m_{n4}(t)$ from the measurement D is available for this correlation check. The reference mixer output signal which fits the coordinates of the obstructions H-1–H-4 having the highest level is correlated with this mixer output signal $m_{n4}(t)$. If this is a real obstruction, i.e., H1–H3, then the product of the mixer output signal and the reference mixer output signal will result in a correlation level W having a magnitude corresponding to the target signal amplitude. On the other hand, if this is a spurious obstruction, i.e., H4, the correlation with the references mixer output signal will not result in a correlation level.

The correlation process for the elimination of spurious obstructions is described in more detail in the following text.

A real obstruction having the number $p=0 \ldots P-1$ produces, during the fourth measurement D, a mixer output signal:

$$m_{n4p}(nT_a)=1/2a_p \cos(\omega_{dp}nT_a-\omega_{n4}T_{rp}-\omega_{dp}T_{rp});$$

where $T_{rp}$ is the signal delay time and $\omega_{dp}$ is the Doppler angular frequency, and since:

$$\omega_{n4}(N)=\omega_r+110 \cdot \omega_r+(5^m \text{mod} 37) \cdot \omega_r;$$

$$\omega_{n4}(M)=\omega_r+110 \cdot \omega_r+(5^m \text{mod} 37) \cdot \omega_r;$$

and $$n=0 \ldots 71; m=\text{int} n/2;$$

it can also be stated approximately that:

$$m_{n4p}(mT_a)=1/2a_p \cos(\omega_{dp}mT_a-\omega_{n4}T_{rp}-\omega_{dp}T_{rp});$$

where $\omega_{dp}$ and $T_{rp}$ are the characteristic variables of this obstruction. Substitution of the frequency encoding $x(n)$ for the transmitted signal $s_{n4}(t)$ now gives:

$$m_{n4p}(nT_a)=1/2a_p \cos((\omega_{dp}nT_a-x(n) \cdot \omega_i T_{rp}-(\omega_{dp}T_{rp}+\omega_i T_{rp}+110 \cdot \omega_i T_{rp})).$$

The constant phase term is in this case shortened using:

$$\phi_{cp}+\omega_{dp}T_{rp}+\omega_i T_{rp}110 \cdot \omega_i T_{rp};$$

giving:

$$m_{n4p}(nT_a)=1/2a_p \cos(\omega_{dp}nT_a-x(n) \cdot \omega_i T_{rp}-\phi_{cp}).$$

The argument in this case forms a phase sequence $\phi_{np}$ (n) where n=0 ... 71 or $\phi_{mp}$ (m) where m=0 ... 35, which is determined by x(n), $\omega_{pd}$ and $T_{rp}$. This is present in the received signal only when a real obstruction i.e., an object reflecting signals having the delay time $T_{rp}$ and the Doppler angular frequency $\omega_{dp}$ is actually present. For example, a stationary single target having the number p=0 at the distance:

$$R_o = \frac{256}{37} = 6.92 \text{ m}$$

produces the phase sequence:

$$\phi_{no}(n) = -x(n) \cdot 2\pi f_i \cdot T_{ro} - \phi_{co};$$

$$\phi_{no}(n) = -(5^m \bmod 37) \cdot 2\pi f_i \cdot 2R_o/c - \phi_{co};$$

$$\phi_{no}(n) = -(5^m \bmod 37) \cdot 2\pi/37 - \phi_{co};$$

where $T_{ro} = 2R_o/c$; while a spurious target produces only a random phase sequence.

The initial angle $\phi_{co}$ cannot be determined from the measured target coordinates of the obstruction since no exact value is available for the carrier frequency $\omega_t$. However, only slight drift therein causes a considerable change in the initial angle $\phi_{co}$. This problem is solved according to the invention because the correlation is carried out a plurality of times using different angles $\phi_{co}$, for example in steps of 15–30 degrees, until the highest correlation level is found for the obstruction. Despite this approximation, it can be assumed that a high correlation level will not be produced in the case of a spurious obstruction. The summation of 72 samples from the measurement D represents an adequate averaging process, which gives very low levels, even for an optimized $\phi_{cp}$, for the random psuedo-reflection signal from a spurious obstruction.

The analysis so far has considered only the mixer output signal $m_{n4p}$ (t) for one obstruction. However, the actual mixed output signal $m_{n4}$ (t) at the mixer is a sum of the reflected received signals $m_{n4p}$ from all the detected obstructions P:

$$m_{n4}(nT_a) = \sum_{P=0}^{P-1} m4_p(nT_a);$$

where p=0 ... P−1; n=0 ... 71

$$m_{n4}(nT_a) \sum_{p=0}^{p-1} a_p \cdot \cos(\omega_{dp} nT_a - x(n) \cdot \omega_i T_{rp} - \phi_{cp});$$

where $x(n) = 5^m \bmod 37$, m=int n/2.

The mixer output signal comprises 72 real samples. In this case, the transmitted frequency $f_{n4}(t)$ changes only after ever other sample, so that constant-frequency bursts having the same frequency are transmitted with a duration of two sample periods. This measure artificially extends the transient response of the receiving unit to the reflection situation, so that the received signals $e_{n4}(t)$ can be read in with high quality.

It follows for the largest obstruction that P=0, that is to say that, for the obstruction having the highest amplitude, the correlation with the reference mixer output signal which has been calculated from the speed and distance values of the obstruction in the speed/distance diagram is:

$$W_0 = \sum_{n=0}^{71} m_{n4}(nT_a) \cdot \cos(\omega_{do} nT_a - x(n) \cdot \omega_i T_{r0} - \phi_{c0}).$$

As described above, the constant phase term $\phi_{co}$ must be determined for each obstruction by searching for the highest correlation level. The correlation level $W_0$ obtained is thus:

$$W_0 = a_0 \sum_{n=0}^{71} [\cos(\omega_{do} nT_a - x(n) \cdot \omega_i T_{r0} - \phi_{c0})]^2.$$

Normalization is carried out, and comparison with the normalized signal level $a_0$ found for the obstruction:

$$\frac{W_0}{72} \geq C_s \cdot a_0;$$

where $C_s$ is the threshold factor.

If a real obstruction is present, its reference mixer output signal is subtracted from the mixer output signal $m_{n4}(nT_a)$:

$$m_{n4p}(nT_a) = m_{n4}(nTa) - a_0 \cos(\omega_{do} nT_a - x(n) \cdot \omega_i T_{r0} - \phi_{c0});$$

where n=0 ... 71. The process is applied iteratively to all possible obstructions H1–H4.

Although the invention has been described herein with reference to a specific embodiment, many modifications and variations therein will readily occur to those skilled in the art. Accordingly, all such variations and modifications are included within the intended scope of the invention.

We claim:

1. A radar process for measuring distances and relative speeds between a vehicle and one or more obstructions comprising:

transmitting continuous constant-frequency, frequency-coded radar signal bursts from a vehicle without any time interval between the bursts;

simultaneously receiving radar signals which are reflected from obstructions during the transmission of the continuous transmitted signals;

mixing in a single-channel mixer the received signals reflected from obstructions with the transmitted signals which are separated into frequency-coded bursts to obtain a real mixer output signal representing a difference frequency between the transmitted signals and the received signals as a mixing product of the transmitted and received signals; and processing the real mixer output signals in a signal processing device to obtain signal values representing the distances between the obstructions from which signals are reflected and the vehicle and the relative speeds between the vehicle and the obstructions from which signals are reflected.

2. A process according to claim 1 including:

producing constant-frequency radar signal bursts which follow one another without any time interval by driving an oscillator during a first measurement at a frequency which increases linearly and incrementally for successive bursts from a minimum frequency value to a maximum frequency value and providing a number of bursts corresponding to a desired resolution;

producing constant frequency radar signal bursts by driving an oscillator during a second measurement at a frequency which decreases linearly and incrementally for successive bursts from the maximum value to the minimum value;

obtaining a real mixer output signal relating to an amplitude curve representing a difference frequency between transmitted and received signals for the distances to the obstructions and the relative speeds between the vehicle and the obstructions by mixing the bursts of the respective transmitted and received signal during the first and second measurement;

producing constant frequency radar signal bursts by driving an oscillator during a third measurement at the same frequency for every burst;

obtaining a real mixer output signal relating to an amplitude curve for the relative speeds between the vehicle and the obstructions by mixing the transmitted signal with the reflected received signal during the third measurement;

converting the real mixer output signals received during the measurements by Fourier transformation into relative speed-dependent and distance-dependent frequency values which represent families of intersecting straight lines in a relative speed/distance diagram in which the intersections indicate obstructions;

producing radar signal bursts which follow one another in time by driving an oscillator during a fourth measurement at different frequencies selected for correlation encoding;

mixing the frequency-encoded bursts of the transmitted and received signals to produce a real mixer output signal during the fourth measurement; and comparing the mixer output signals corresponding to obstructions in the fourth measurement with reference mixer output signals which are derived from the intersections of the relative-speed distance diagram.

3. A process according to claim 2 wherein only one sample is supplied to the mixer for each burst of the transmitted signal and of the received signal for the duration of a reflected burst of the received signal.

4. A process according to claims 2 including:

producing bursts during the fourth measurement which are successive in time, at frequencies in accordance with the relationship:

$$f_{n4}(t)=f_t+f_{incr}(A^n \bmod (P))$$

where n=0 ... N−1, N=P−1, P is a prime number, and A is a natural number which is selected so that N different coefficients are produced, $f_t$ is the carrier frequency of the oscillator and $f_{incr}$ is the frequency increment.

5. A process according to claim 2 wherein a reference mixer output signal is determined in each measurement, including the fourth measurement, from the speeds and distances which correspond to the intersections on the speed/distance diagram, and the reference mixer output signal is correlated with the mixer output signal obtained in the fourth measurement so that a correlation level which is above a predetermined threshold value is obtained for a real obstruction and a correlation level which is below the threshold value is obtained for a spurious obstruction.

6. A process according to claim 5 wherein the phase angle of the mixer output signal of the fourth measurement is determined so that a correlation is carried out with various phase angles and the phase angle having the highest correlation level is assumed to be the actual phase angle of the mixer output signal.

7. A process according to claim 5 wherein an inference is drawn when determining whether an obstruction is real or spurious as to the value of an associated fictional mixer output signal and this value is subtracted from the mixer output signal and the correlation is then carried out with the reference mixer output signal of a further intersection.

8. A process according to claim 7 wherein the fictional mixer output signal is the reference mixer output signal of the obstruction.

* * * * *

UNITED STATES PATENT AND TRADEMARK OFFICE
CERTIFICATE OF CORRECTION

Page 1 of 4

PATENT NO. : 5,757,308

DATED : May 26, 1998

INVENTOR(S) : Lissel et al.

It is certified that error appears in the above-identified patent and that said Letters Patent is hereby corrected as shown below:

Column 6, line 11, "$f_{n3}(n)=f_t+128-f_i$", should be -- $f_{n3}(n)-f_t+128f_i$ --;

Column 6, line 19, "$f_{n4}(n)=f_t+110-f_i=(5^m \bmod 37)f_i$" should be

-- $f_{n4}(n)-f_t+110f_i=(5^m \bmod 37)f_i$ --;

Column 6, line 33, "$M_n(t)$" should be -- $m_n(t)$ --;

Column 6, line 36, "$m_n(t) = 1/2a \, .\cos(\omega_n = \omega_d)(t-T_r)-\omega_n t);$" should be -- $m_n(t) = \frac{1}{2}a \, .\cos((\omega_n + \omega_d)(t-T_r) -\omega_n t);$ --;

Column 7, line 1, "$=N/f_a$" should be -- $=\frac{N}{f_a}$ --;

Column 7, line 2, "$\omega shift/N$" should be -- $\frac{\omega shift}{N}$ --;

UNITED STATES PATENT AND TRADEMARK OFFICE
CERTIFICATE OF CORRECTION

PATENT NO. : 5,757,308

DATED : May 26, 1998

INVENTOR(S) : Lissel et al.

It is certified that error appears in the above-identified patent and that said Letters Patent is hereby corrected as shown below:

<u>Column 8, line 64</u>, "$\Phi_{cp} + \omega_{dp} T_{rp} + \omega_t T_{rp} 110.\omega_i T_{rp}$" should be -- $\varphi_{cp} = \omega_{dp} T_{rp} + \omega_t T_{rp} + 110.\omega_i T_{rp}$ --;

<u>Column 8, line 66</u>, "$m_{n4p}(nT_a) = 1/2 a_p . \cos(\omega_{dp} nT_a - x(n).\omega_i T_{rp} - \Phi_{cp})$" should be -- $m_{n4p}(nT_a) = \frac{1}{2} a_p . \cos(\omega_{dp} nT_a - x(n).\omega_i T_{rp} - \varphi_{cp})$ --;

<u>Column 9, line 1</u>, "$\Phi_{np}$" should be -- $\varphi_{np}$ --;

<u>Column 9, line 2</u>, "$\Phi_{mp}$" should be -- $\varphi_{mp}$ --;

<u>Column 9, line 16</u>, "$\Phi_{n0}(n) = -x(n).2\Pi fi.T_{r0} - \Phi_{c0}$" should be -- $\varphi_{n0}(n) = -x(n).2\Pi fi.T_{r0} - \varphi_{c0}$ --;

UNITED STATES PATENT AND TRADEMARK OFFICE
CERTIFICATE OF CORRECTION

Page 3 of 4

PATENT NO. : 5,757,308

DATED : May 26, 1998

INVENTOR(S) : Lissel et al.

It is certified that error appears in the above-identified patent and that said Letters Patent is hereby corrected as shown below:

Column 9, line 17, "$\Phi_{n0}(n) = -(5^m \bmod 37).2\Pi fi.2R_0/c - \Phi_{c0}$" should be $$-- \varphi_{n0}(n) = -(5^m \bmod 37).2\Pi fi.\frac{2R_0}{c} - \varphi_{c0} --;$$

Column 9, line 18, "$\Phi_{n0}(n) = -(5^m \bmod 37).2\Pi/37 - \Phi_{c0}$" should be $$-- \varphi_{n0}(n) = -(5^m \bmod 37).\frac{2\Pi}{37} - \varphi_{c0} --;$$

Column 9, line 23, "$\Phi_{c0}$" should be -- $\varphi_{c0}$ --;

Column 9, line 26, "$\omega_r$" should be -- $\omega_t$ --;

Column 9, line 28, "$\Phi_{c0}$" should be -- $\varphi_{c0}$ --;

Column 9, line 30, "$\Phi_{c0}$" should be -- $\varphi_{c0}$ --;

Column 9, line 37, "$\Phi_{cp}$" should be -- $\varphi_{cp}$ --;

Column 9, line 51, "$\Phi_{cp}$" should be -- $\varphi_{cp}$ --;

UNITED STATES PATENT AND TRADEMARK OFFICE
CERTIFICATE OF CORRECTION

PATENT NO. : 5,757,308

DATED : May 26, 1998

INVENTOR(S) : Lissel et al.

It is certified that error appears in the above-identified patent and that said Letters Patent is hereby corrected as shown below:

Column 9, line 56, "only after ever other sample" should be -- only after every other sample --;

Column 10, line 1, "$\Phi_{c0}$" should be -- $\varphi_{c0}$ --;

Column 10, line 5, "$\Phi_{c0}$" should be -- $\varphi_{c0}$ --;

Column 10, line 10, "$-\Phi_{c0})]^2$ should be -- $-\varphi_{c0})]^2$ --;

Column 10, line 23, "$-\Phi_{c0})$ should be -- $-\varphi_{c0})$ --;

Column 12, line 1, "according to claims 2" should be --according to claim 2"--.

Signed and Sealed this

Second Day of November, 1999

Attest:

Q. TODD DICKINSON

*Attesting Officer*　　*Acting Commissioner of Patents and Trademarks*